United States Patent Office 2,855,803
Patented Oct. 14, 1958

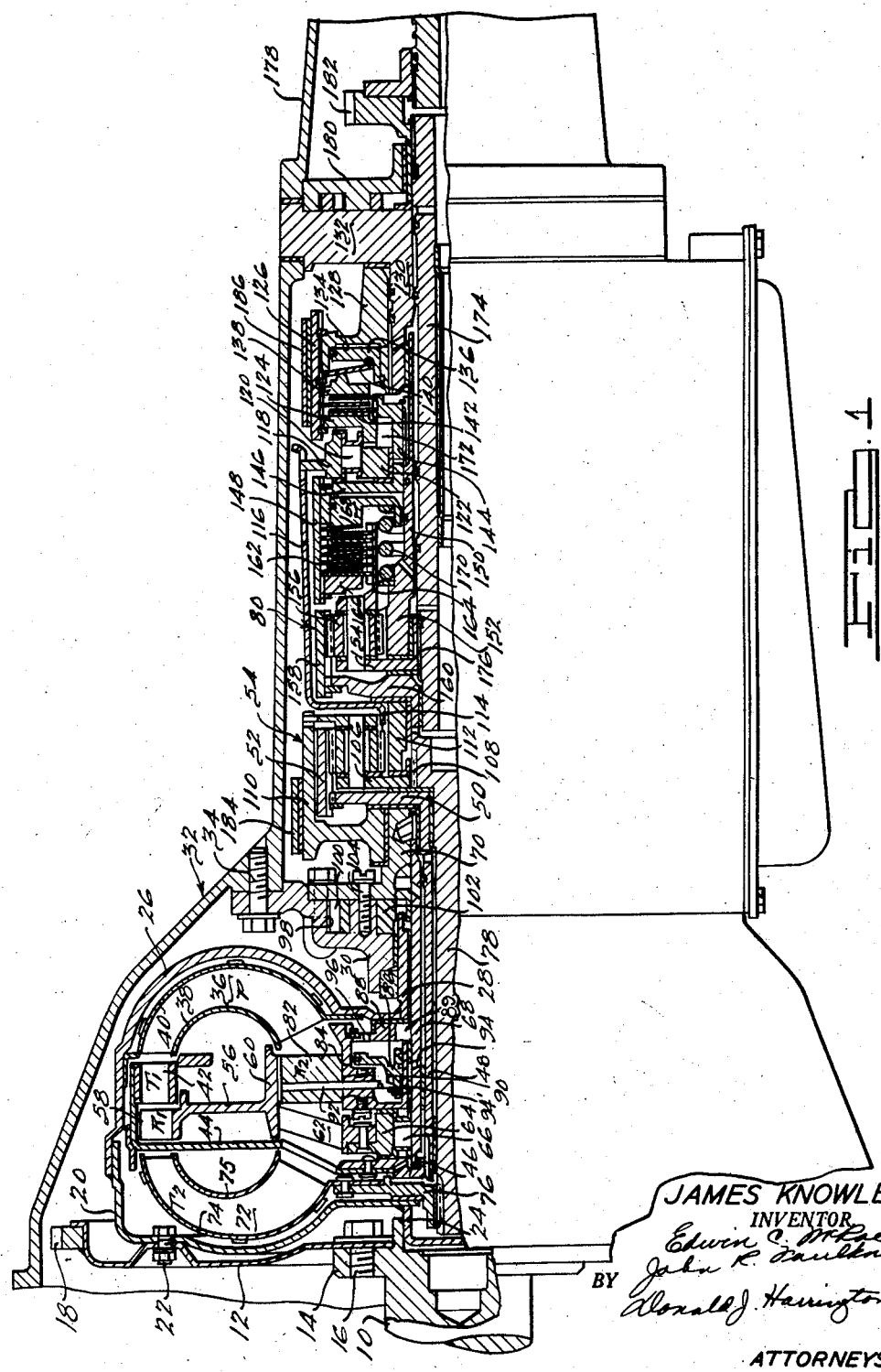

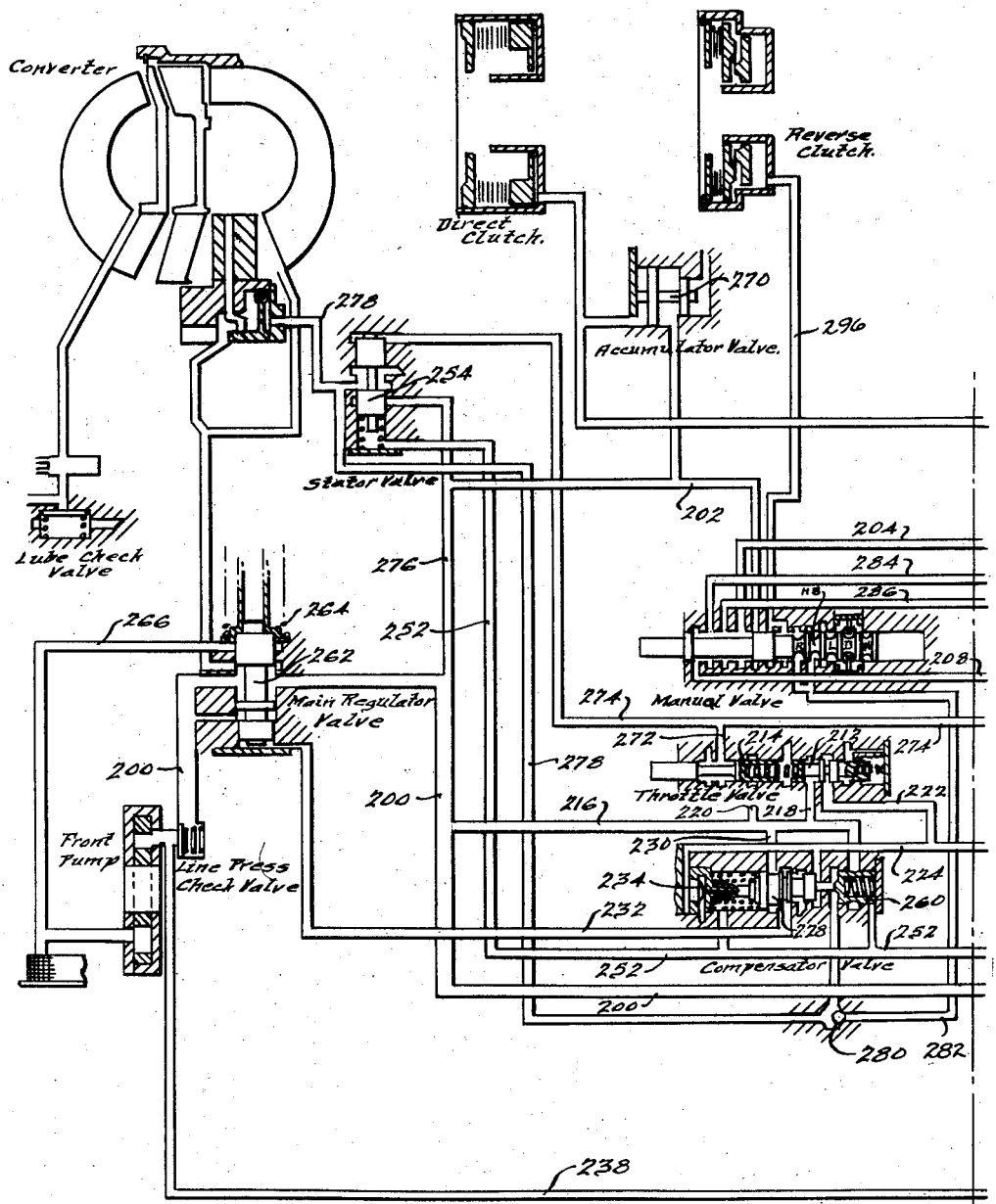

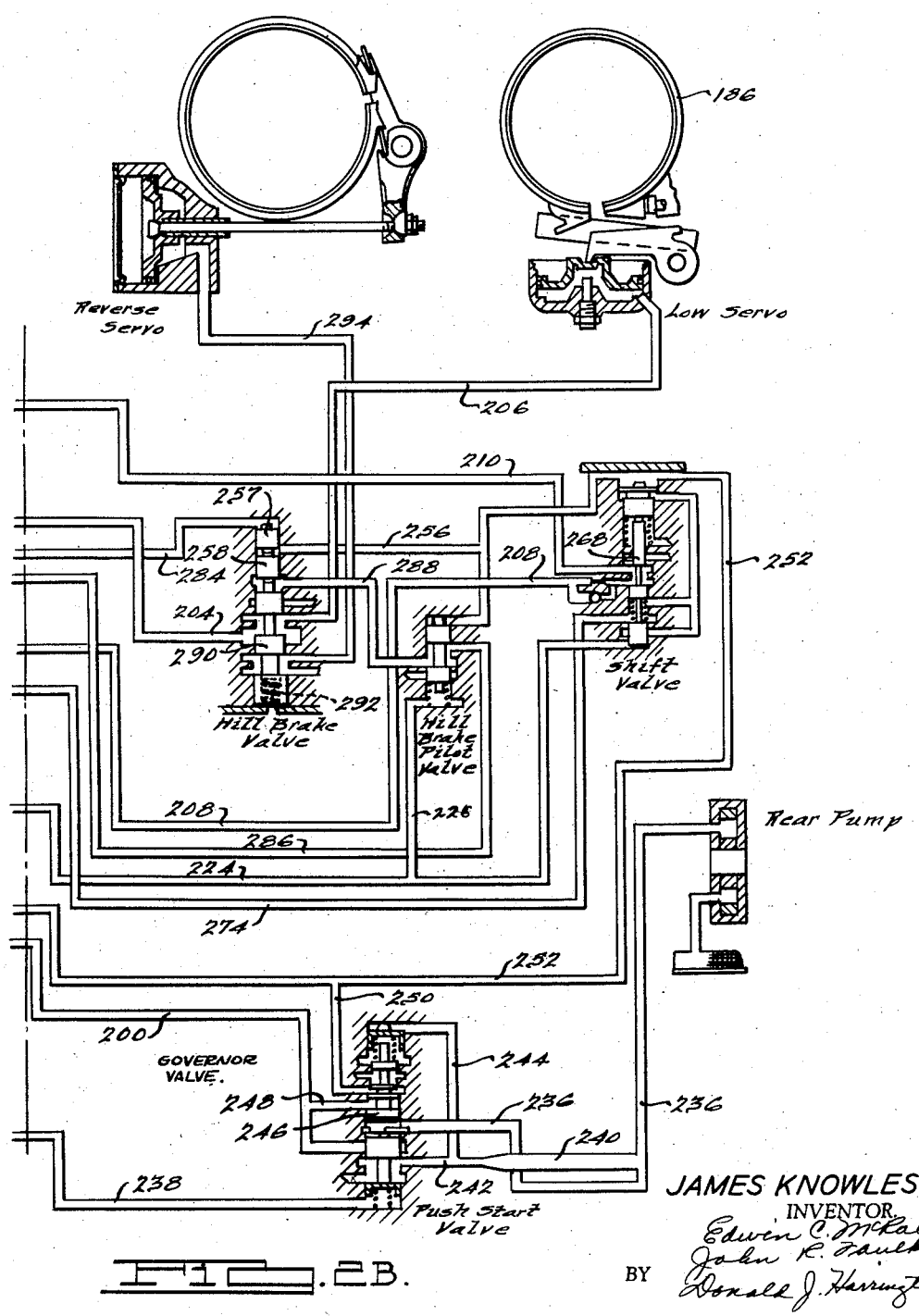

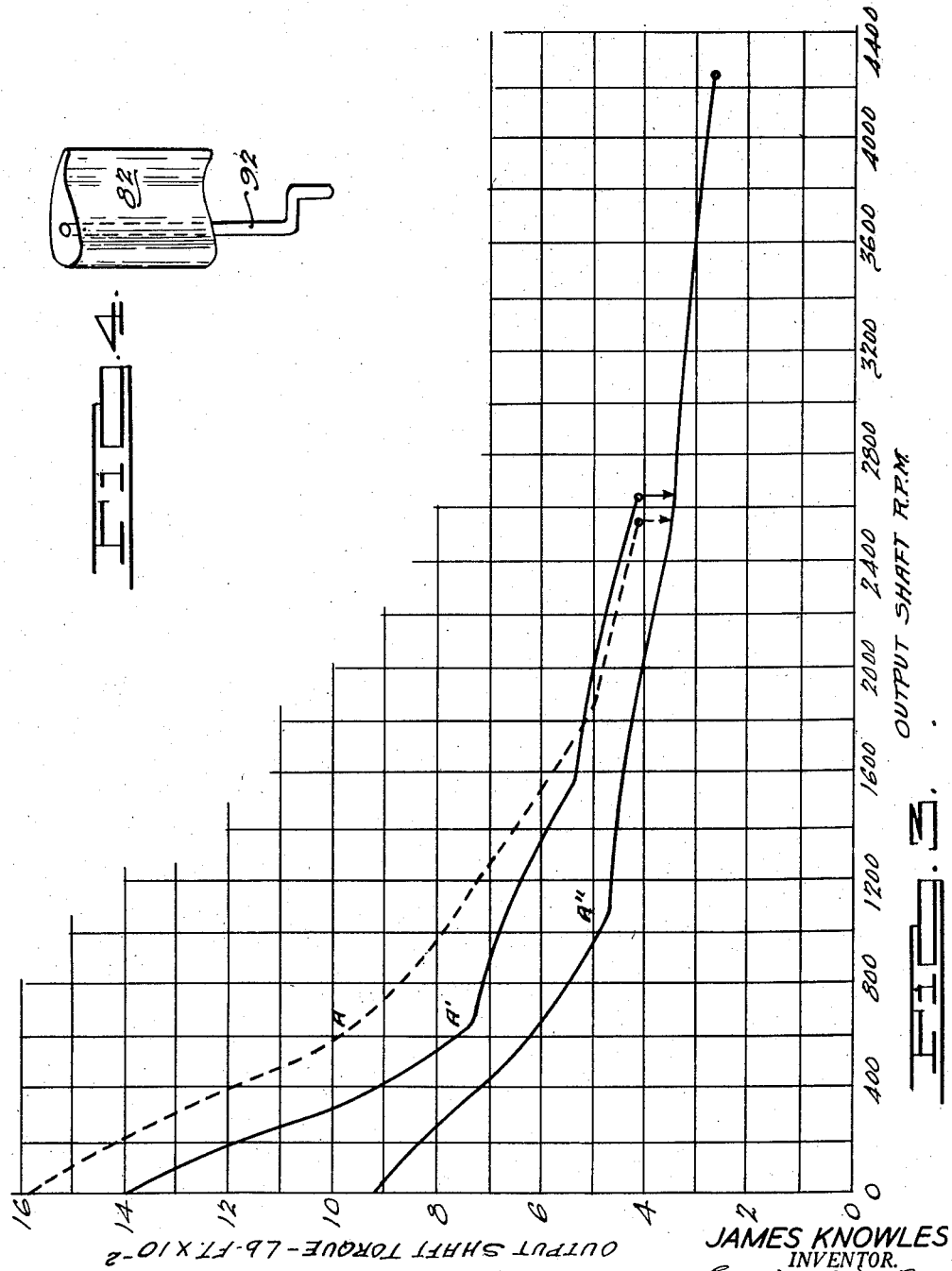

2,855,803

TWIN TURBINE TRANSMISSION

James Knowles, Bloomfield Hills, Mich., assignor to Ford Motor Company, Dearborn, Mich., a corporation of Delaware Application October 18, 1956, Serial No. 616,878

20 Claims. (Cl. 74—677)

My invention relates generally to a new and improved multiple speed power transmission mechanism capable of being used with a wheeled vehicle for transmitting an uninterrupted flow of power from the vehicle engine to the vehicle traction wheels while automatically providing for a variation in the torque multiplication ratio.

According to a principal feature of my invention, provision is made for establishing any one of several gear reduction ratios as determined by the vehicle operating requirements, and for effecting an infinitely variable torque multiplication within the operating range defined by two of said established gear reduction ratios.

The provision of an improved power transmission mechanism of the type above set forth being a principal object of my invention, it is a further object of my invention to provide an automatic, multiple speed, power transmission wherein at least a portion of the torque multiplication range of the transmission is characterized by an infinite variation in ratio and wherein a transition from one gear reduction ratio to another outside the aforementioned portion of the operating range is characterized by a maximum degree of smoothness.

It is a further object of my invention to provide an improved power transmission mechanism having a plurality of established torque multiplication ratios wherein a smooth transition from one gear reduction ratio to another may be effected without the need for sequentially energizing and de-energizing transmission clutch and brake elements in timed relationship.

It is a further object of my invention to provide a multiple speed power transmission mechanism which comprises a multiple turbine, hydrokinetic torque converter in combination with a planetary gear train wherein the turbine elements are each drivably connected to separate gear members of the gear train, the effective torque multiplication ratio obtainable with the gear train for any given set of operating variables being determined by the ratio of the torque developed by each turbine member.

It is a further object of my invention to provide an automatic multiple speed power transmission wherein the individual gear elements are controlled by clutch and brake elements and wherein a shift from one gear reduction ratio to another during operation may be obtained by merely engaging or disengaging a gear motion controlling clutch with no synchronizing being required.

It is a further object of my invention to provide a transmission as set forth above wherein a hydrokinetic torque converter is coupled to planetary gear elements of a multiple speed power transmission and wherein the torque converter stator is comprised of multiple, bladed stages, the angle of the blades of one stage relative to the other components of the converter unit being automatically adjustable to alter the torque converter operating characteristics and to provide optimum overall transmission performance.

Other objects and advantages of my invention will more readily become apparent from the following description and from the accompanying drawings.

In carrying forth the foregoing objects, I have provided a hydrokinetic torque converter disposed in combination with a planetary gear type transmission, said torque converter having a compound turbine with primary and secondary members thereof drivably connected to individual gear elements of a compounded planetary gear train. During the initial stages of operation, power is transferred from the primary turbine member to the ring gear of a first planetary gear unit and the sun gear of the first planetary gear unit is held stationary by means of a mechanical friction brake mechanism acting in cooperation with a one-way coupling or brake. The carrier member of the first planetary gear unit is drivably coupled to the ring gear of a second planetary gear unit and the secondary turbine member of the torque converter unit is also connected thereto to provide a dual power delivery path. The torque exerted on the primary turbine member exceeds that which is exerted on the secondary turbine member during operation of the converter unit at relatively low converter speed ratios, the sun gear of the first planetary unit serving as a reaction member. As the converter speed ratio increases, the torque capacity of the secondary turbine increases and the torque capacity of the primary turbine decreases until the above mentioned one-way brake begins to overrun. Upon a subsequent increase in the torque capacity of the secondary turbine relative to the torque capacity of the primary turbine, ineffective and the first planetary gear unit becomes the combined torque multiplication ratio of the primary turbine and the first planetary unit approaches unity, the entire speed reduction in the planetary portion of the transmission thereafter occurring in the second planetary gear unit. A second one-way brake acts in cooperation with the above mentioned friction brake mechanism and the second planetary gear unit and a further upshift from the intermediate speed reduction ratio to a direct drive may be obtained by clutching together two of the planetary gear elements of the second planetary gear unit while the friction brake mechanism remains energized.

To obtain reverse drive, an additional reverse brake mechanism is provided for anchoring the carrier member of the first planetary gear unit. The primary turbine member then drives the ring gear of the first planetary gear unit and the sun gear of the first planetary gear unit drives the sun gear of the second planetary gear unit through a reverse clutch mechanism, the latter being energized simultaneously with the above mentioned reverse brake mechanism.

A down shift from direct forward drive to an intermediate ratio may readily be obtained by simply disengaging the above described direct drive clutch which serves to clutch together two of the gear elements of the second planetary gear unit as above described. No other gear control element must be energized or de-energized during this down shift operation and the timing problem which accompanies such a shift in automatic transmissions of known construction is thus entirely eliminated.

In addition to the above, it is possible under some operating conditions to obtain a down shift from direct drive operation to an itnermediate ratio without energizing or deenergizing any of the transmission gear control elements. This may be accomplished when the vehicle engine is operated at part throttle with a sufficient reserve torque available so that the primary turbine may be overspeeded with respect to the second turbine when the engine throttle is opened to a more advanced setting. In this instance the ring gear of the first planetary gear unit will overspeed its associated sun gear. The sun gear will serve as a reaction member for the planetary gear unit since the one-way brake cooperating with the friction brake mechanism above described will prevent reverse rotation of the same. It will thus be apparent that the transmission is capable of a two stage kick down wherein one of the kick down stages may be effected independently of the clutch and brake gear control elements and wherein the second kick down stage may be accomplished merely by disengaging a single clutch mechanism while the other clutch and brake elements of the transmission retain their previously assumed operating condition.

According to a further feature of my invention, the torque converter unit includes a bladed stator having blade elements which are adjustable to provide either of two angular stator blade positions thereby varying the characteristics of the converter as desired. In general, the adjustable blades of the converter stator may assume an angle favorable to low speed high torque operating conditions or an angle favorable to high speed operation. An operator controlled valve means is provided for controlling the distribution of fluid pressure to the converter stator mechanism to actuate the blade shifting mechanism. The change in the converter characteristics accompanying a shift in the converter stator blade angles produces a change in the overall torque multiplication ratio which is analogous to that which is experienced during a gear ratio shift. The shiftable stator feature therefore increases the effective torque multiplication range of the transmission.

For the purpose of more particularly describing the principal features of my invention, reference will be made to the accompanying drawings wherein:

Figure 1 is a longitudinal cross-sectional view of the transmission assembly with portions thereof shown in elevation;

Figures 2A and 2B show a schematic representation of the control valve circuit for controlling the motion of the gear elements of the transmission of Figure 1 and for regulating the position of the adjustable converter stator stage;

Figure 3 is a graphic representation of the transmission performance when used with a typical automotive vehicle engine. The chart of Figure 3 shows a plot of the variation in transmission output torque for various output speeds and for a given engine torque and engine speed, and;

Figure 4 is a detail view of a single stator blade of the adjustable stator stage.

Referring first to the assembly of Figure 1, numeral 10 designates an engine crankshaft which may be bolted to a transmission drive plate 12 as indicated, a flange 14 and bolts 16 being provided for this purpose. A suitable ring gear 18 may be secured about the periphery of the drive plate 12 to facilitate engagement with an engine starter motor pinion. Drive plate 12 may be secured to a torque converter enclosure member 20 by suitable bolts 22. A suitable pilot element 24 is centrally carried by the hub of enclosure member 20, said element 24 being received within a mating pilot opening in the crankshaft 10. A second converter enclosure member 26 is joined to the aforementioned member 20 and is situated in juxtaposed relationship with respect to the same. The hub of the enclosure member 26 has secured thereto a sleeve 28 extending longitudinally within an opening formed in the transverse wall 30 of the transmission housing, said housing being generally designated in Figure 1 by numeral 32. The wall 30 may be secured within the housing 32 by bolts 34 and it may extend transversely with respect to the longitudinal axis of the housing 32 on one side of the converter enclosure member 26.

The enclosure member 26 may be shaped so as to define a portion of toroidal recess within which a torque converter pump member 36 may be received, said pump member 36 including an inner and an outer shroud as indicated at 38 and 40 respectively. Shrouds 38 and 40 have interposed therebetween a cascade of pump blades disposed about the axis of the pump member 36 in a conventional manner thereby defining a series of generally radial fluid passages. A primary turbine member 42 is situated directly adjacent the outlet side of the pump member 36 and it includes a series of turbine blades interposed between an inner and outer shroud. The primary turbine member 42 is supported by a radially extending member 44 which is joined to the outer shroud of the primary turbine member and which is secured at the radially inward portion thereof to a hub member 46. The turbine support 44 is discontinuous in the region of the fluid flow path so as to eliminate as much as possible any restriction to the free flow of fluid through the torus circuit.

The hub member 46 is pivotally splined to a sleeve shaft 48 which extends in a longitudinal direction and which is joined to a radially extending flange 50, the latter being positively connected to a drum shaped internal ring gear 52 of a first planetary unit generally designated by numeral 54.

The compound reactor or stator assembly is designated in Figure 1 by numeral 56 and it includes a peripheral bladed portion 58 situated adjacent the exit side of the bladed primary turbine member 42. The stator assembly 56 further includes a central shroud 60 and a centrally positioned stator support 62. The assembly 56 is fixed to a central hub 64 which forms an outer race for a one-way brake mechanism 66. The inner race of the one-way brake mechanism 66 is defined by a relatively stationary stator sleeve 68 which extends longitudinally and which is secured to an adapter 70 fixed to the aforementioned transverse wall 30.

A secondary turbine member 72 is situated adjacent the aforementioned converter enclosure member 20 with the inlet side thereof situated directly adjacent the bladed periphery 58 of the reactor assembly 56 and with the exit side thereof situated adjacent the support member 44. The secondary turbine member 72 includes inner and outer shrouds 74 and 75 respectively within which are situated a cascade of turbine blades in a conventional fashion. The turbine member 72 is secured to a central hub member 76 which in turn is positively splined to a central power delivery shaft 78 extending to the aforementioned planetary unit 54 and to a second planetary unit generally designated by numeral 80.

A second reactor stage is interposed between support 62 and the inlet region of the converter pump 36 and it includes adjustable blades 82 situated between the aforementioned reactor shroud 60 and a hub member 84. The hub member 84 is formed with an annular recess defining an annular working chamber within which is positioned an annular piston 86, said piston being adapted to move longitudinally within the hub 84. The end of the annular opening in the hub 84 is closed by a closure member 88 which may be secured in place by a snap ring or by other suitable retainer means. Closure member 88 further serves as a reaction member against which the pump member 36 and the associated member 26 may act, a suitable thrust ring being interposed between the juxtaposed sides of the closure member 88 and the hub of the member 26. A one-way brake device may be provided for braking the second reactor stage to stator sleeve 68 as shown at 89.

The piston 86 is formed with an annular groove 90 within which is positioned the radially inward ends of a plurality of stator blade shafts or shift levers 92, one reactor blade 82 being mounted on and supported by each of the individual levers 92 as illustrated. Fluid pressure may be admitted to the working cylinder formed in the reactor hub 84 on one side of the piston 86 through pressure passages 94 and 94', the former communicating with the annular space between sleeve shaft 48 and the stationary shaft 68. The fluid pressure existing in the interior of the converter fluid circuit may be caused to act on the other side of the piston 86 for biasing the latter in a leftward direction as viewed in Figure 1, a suitable opening 96 being formed in the closure member 88 for this purpose.

The aforementioned partition 30 is formed with a pump recess 98 adapted to receive an internal pump gear element 100 and an eccentrically positioned external driving pinion 102 situated in engaged relationship with respect to the pump gear 100 in a conventional manner. The pump recess 98 is covered by the aforementioned adapter 70, suitable bolts 104 being provided for this purpose. The sleeve 28 secured to the hub of the converter enclosure member 26 is positively connected to the pump driving pinion 102 thereby providing a driving connection between the gear pump and the engine crankshaft 10.

The first planetary unit 54 is further comprised of a carrier assembly 106 which may be positively splined to the central shaft 78 as shown at 108. The carrier assembly 106 includes a drum shaped portion 110 surrounding the planetary unit 24 and journaled on the adapter 70 in concentric relationship with respect to the axis of the transmission. Planetary unit 54 further includes planet gears carried by the carrier assembly 106 in driving engagement with a sun gear 112 and the ring gear 52. Sun gear 112 is positively connected at 114 to one end of a drum like torque transfer member 116, the other end thereof being positively coupled to the outer race 118 of an overrunning one-way coupling means or brake 120. The inner race of the brake 120 is designated by numeral 122 and it forms a part of a coupling disc back up member 124 which may be positively connected to a drum 126. A brake supporting member 128 is journaled on an extension 130 of an end plate 132, the latter being secured to the end of the transmission housing 32. The member 128 is formed with an annular recess 134 within which is slidably positioned an annular piston 136 which defines in part a fluid working chamber on the right side thereof. A movable clutch actuating disc 138 is splined to the internally splined drum 126 and is adapted to be moved axially by the piston 136 as fluid pressure is admitted through the working chamber on the right side of the piston 136. The fluid pressure force exerted on the piston 136 may be transferred to the disc 138 through a conical spring 140, the latter serving to retract the piston 136 when clutch operating fluid pressure is relieved. Multiple clutch or coupling discs are interposed between the back up member 124 and the actuating disc 138, as shown at 142, alternate ones of the discs 142 being splined to the internally splined drums 126 and the remaining discs 142 being drivably splined to clutch member 144.

The clutch member 144 includes a radially extending flange 146 which is positively connected to a drum 148. Clutch member 146 is positively splined to a sleeve 150 which in turn is internally joined to a sun gear 152 of the second planetary unit 80. The planetary unit 80 further includes a carrier assembly 154 on which are mounted a plurality of planet gears 156, said gears 156 being drivably engaged with the aforementioned sun gear 152 and a ring gear member 158. The ring gear member 158 is in turn connected to the aforementioned central shaft 78 by means of a radially extending flange 160 extending between the shaft 78 and the ring gear 158.

The drum 148 is internally splined and it is adapted to receive therein a plurality of externally splined direct drive clutch discs 162. Alternate ones of the discs 162 are internally splined to an extension 164 carried by the carrier assembly 154 of the planetary unit 80. A clutch back up plate 166 is also splined to the internally splined drum 148 in adjacent relationship with respect to the clutch discs 162.

The radial extension 146 of the clutch member 144 is adapted to define in part an annular working chamber within which is slidably positioned a clutch actuating piston member 168, said piston member 168 being situated adjacent the clutch discs 162 and adapted to compress the same into frictional engagement when fluid under pressure is admitted to the working chamber on the right side of the piston 168, as viewed in Figure 1. A compression spring 170 is situated between the piston 168 and a spring seat carried by the sleeve 150 for the purpose of biasing the piston 168 in a right hand direction to de-energize the clutch disc.

An overrunning one-way coupling means or brake mechanism 172 is situated between the clutch member 144 and the back up member 124 for the purpose of accommodating relative rotation between these numbers in one direction while preventing such relative rotation in the opposite direction.

The carrier assembly 154 is positively connected to a power output shaft 174 as shown at 176, said shaft 174 being centrally disposed in axial alignment with the aforementioned shaft 78 and extending through the end plate 132 to the exterior of the housing 32. A tail shaft housing 178 surrounds the external portion of the shaft 174 and it is bolted in a suitable fashion to the end plate 132.

A rear pump housing 180 is also secured to end plate 132 and it defines a pump cavity within which a pair of interengaged pump gears is situated, the innermost drive gear of the rear pump being positively connected to the shaft 174. A parking brake ratchet 182 is also positively connected to the shaft 174 and is formed with external ratchet teeth which are adapted to engage a parking pawl carried by the transmission tail shaft housing 178.

The aforementioned drum shaped portion 110 of the front planetary unit 54 is surrounded by an auxiliary friction brake band 184 which will hereinafter be referred to as the front or reverse drive brake band. Similarly the drum 126 near the rear end of the transmission mechanism is surrounded by a friction brake band 186 forming a part of a mechanical brake mechanism which will hereinafter be referred to as the rear or low speed forward drive brake. Also for purposes of discussion, the multiple disc clutch assembly comprising the clutch discs 162 will hereinafter be referred to as the front or direct drive clutch and the clutch assembly comprising discs 142 will hereinafter be referred to as the reverse or rear clutch. An automatic control valve circuit may be provided for selectively energizing the various clutch and brake elements of the transmission in a desired sequence to obtain variations in the overall transmission speed reduction ratio as required by different operating conditions. The aforementioned front and rear pumps driven by the engine crankshaft and by the transmission tail shaft respectively form a portion of this control circuit. The control valve circuit will be subsequently described in particular detail with reference to Figures 2A and 2B.

During operation of the transmission structure described with reference to Figure 1, power is transmitted from the engine crankshaft 10 to the torque converter pump 36 through the converter housing portions 20 and 26. The pump 36 will be caused to rotate about its axis at engine speed thereby setting up a fluid torus velocity in the torque converter. Torque will be transmitted to the primary turbine member 42 by reason of the change in the direction of the torus flow caused by the primary turbine blade elements. The fluid will pass from the exit side of the primary turbine through a first reaction member 58 which alters the direction of the fluid path to condition the fluid for entry into the secondary turbine member 72. The fluid leaving the reactor portion 58 enters the secondary turbine 72 and exerts a driving torque on the same in known fashion, the direction of the torque acting on the turbine member 72 being in the same direction as the torque exerted on the primary turbine 42. The ratio of the magnitudes of the torque exerted on the primary and secondary turbine members will vary with changes in the torus flow velocity since the direction of the absolute velocity vector with respect to a fixed reference plane will be different for the primary turbine member than for the secondary turbine member. The converter elements are designed so that a greater proportion of the torque will be taken on the primary turbine member when the torque ratio of the converter is at a maximum, the proportion of the torque taken on the secondary turbine becoming progressively greater as the converter torque ratio decreases and approaches unity.

It will thus be apparent that the primary turbine member 42 will initially be driven at a higher speed than the secondary turbine member 72. The motion of the primary turbine member 42 is transmitted to the ring gear of the front planetary unit 54 through the sleeve shaft 48. The secondary turbine member 72 is positively connected to the carrier 106 of the front planetary unit, but since the torque during initial operation following a standing start is substantially less than the torque exerted on the primary turbine, the speed of the carrier 106 will be substantially less than the speed of rotation of the ring gear 52. It is thus apparent that the sun gear 112 will tend to turn in a reverse direction.

To condition the transmission for low gear operation, the rear brake band 186 is applied to the drum 126 thereby holding the clutch race 122 in a stationary position. The one-way coupling means 120 is thus capable of preventing reverse rotation of the sun gear 112 of the front planetary unit 54 since the outer race 118 is positively coupled to the sun gear 112 by the torque transfer member 116. It is thus apparent that the sun gear 112 will serve as a reaction member for the front planetary unit 54 and the carrier 106 is thus caused to drive the ring gear 158 of the second planetary unit 80. The carrier assembly 154 of the second planetary unit 80 is positively splined to the power output shaft 174 as previously described and the sun gear 152 is prevented from rotating in a reverse direction by one-way brake mechanism 172 acting between members 124 and 144, the latter being splined to sleeve 150. It is thus apparent that the power flow path from the engine crankshaft 10 to the power output shaft 174 includes both planetary gear reductions as well as the torque ratio produced by the hydrokinetic converter. This high initial starting torque may be utilized by the vehicle traction wheels to effect a rapid acceleration of the vehicle from a standing start.

When the vehicle begins to accelerate, the magnitude of the torque ratio produced by the torque converter begins to fall off and the torque capacity of the secondary turbine member 72 with respect to the primary turbine member 42 begins to increase. This increase in the relative torque capacity of the secondary turbine member 72 is accomplished by reason of the variation in the direction of the fluid velocity vectors relative to the angle of the blades of the turbine members as the speed ratio changes. The portion of the torque taken by the secondary turbine is fed directly into the ring gear of the second planetary gear unit 80 while the torque taken by the primary turbine member 42 is multiplied through the first planetary unit 54. Therefore the overall torque multiplication produced by the converter and the first planetary unit 54 fades out and approaches a value of unity. When the torque of the secondary turbine member 72 approaches engine torque and the torque of the primary turbine member 42 approaches zero, the first planetary unit 54 becomes ineffective, the power of the secondary turbine member 72 being transferred directly to the ring gear 158 of the rear planetary unit. Thereafter, the entire torque multiplication in the planetary gear portion of the transmission is accomplished by the second planetary gear unit 80 during operation in an intermediate gear ratio. It will be apparent that the variation in torque multiplication which is experienced during the time interval accompanying operation from a standing start to the point where the sun gear 112 overruns will have an infinitely variable characteristic and the transition from the higher torque multiplication ratio to the lower intermediate reduction ratio will take place with a maximum degree of smoothness during the acceleration period of the vehicle. When the torque multiplication of the converter and the first planetary unit 54 fades out as above described, the reaction on the sun gear 112 will cease and the one-way coupling means 120 will permit the sun gear 112 to overrun.

To effect a shift from the above described intermediate ratio to high gear, the front clutch assembly shown at 148, 162, 166 and 168 may be energized thereby clutching together the planetary assembly 154 and the sun gear 152. This produces a 1—1 driving ratio through the second planetary unit 80 and the overall torque multiplication ratio of the planetary portion of the transmission is thus unity. The one-way brake mechanism 172 will accommodate the overrunning motion of the sun gear 152 with respect to the members 124 and 126 since the torque reaction on the sun gear 152 will fade. It is emphasized that friction brake band 186 may be continuously engaged during this shift to a direct drive ratio following engagement of the direct drive clutch, and no synchronization or timing problem between the clutch and brake elements is presented. This feature makes it possible to eliminate the troublesome timing and synchronizing difficulties which are associated with automatic transmissions of conventional construction.

To condition the transmission for reverse drive operation, the reverse brake 184 may be energized together with the rear clutch assembly shown at 142, 124 and 138. The brake 184 will hold the carrier assembly 106 of the first planetary unit 54 and the secondary turbine 72 in a stationary position. Torque will thus be delivered from the primary turbine member 42 to the ring gear 52 of the front planetary unit through the sleeve shaft 48. This tends to drive the sun gear 112 in a reverse direction and this reverse motion of the sun gear 112 is transmitted to the sun gear 152 of the second planetary unit 80 through the torque transfer member 116, the rear clutch assembly and the sleeve shaft 150. The front brake band 184 is also effective to brake the ring gear 158 of the second planetary unit 80 since the ring gear 158 is positively connected to the braked shaft 78 and the carrier assembly 106. The reverse motion thus imparted to the sun gear 152 of the second planetary unit 80 thus tends to drive the carrier assembly 154 and the power output shaft 174 in a reverse direction.

During operation of the transmission at speeds below a preselected value; i. e., 40 M. P. H., a kick down may be obtained by shifting the stator blades 82 of the reactor asembly. This may be accomplished by pressurizing the pressure chamber on the left side of the annular piston 86 of the reactor servo. Pressure may be selectively distributed to the reactor servo in response to movement of the vehicle accelerator pedal to a limiting position as will subsequently be explained with reference to the circuit diagram of Figures 2A and 2B. A reactor blade angle favorable to a high converter torque ratio may be obtained in this fashion although converter efficiency will necessarily be reduced. This feature makes it possible to obtain a high degree of acceleration while the vehicle is operating at a speed below the preselected limiting value. By preference, the limiting speed below which this kick down will function is determined by the speed-torque characteristic of the engine with which the transmission is used. That is, unless an increase in speed will be accompanied by an increase in torque for any given operating range, the converter will be incapable of undergoing a transition from coupling range to converter range during operation of the transmission under steady state road load conditions.

Referring next to the graphical representation of Figure 3, I have illustrated the variation in output shaft torque for various output shaft speeds. It may be observed from inspection of Figure 3 that the transmission is capable of a smooth transition from the high output torque range to the lower output torque ranges. As the output shaft R. P. M. progressively increases, there are no sharp discontinuities in the curves and the vehicle operator does not experience a sudden change in engine R. P. M., the change from one gear ratio to another being almost imperceptible. The first curve identified in Figure 3 by letter $a$ represents a variation in output shaft torque with changes in output shaft speed while the converter stator is in the down shift position. The other two curves illustrated in Figure 3 by letters $a'$ and $a''$ represent the speed torque characteristics for low speed cruising range and direct drive respectively.

I have shown in Figure 4 a detail view of one blade of the adjustable stator assembly. By preference the leading edge of the blade is rounded and is formed with a relatively large camber. The lower end of lever 92 is offset as shown to provide a leverage for positioning the blade.

Referring next to Figures 2A and 2B, the control valve circuit for regulating the relative motion of the transmission gear elements is illustrated in particular detail. It will be apparent that the front pump, shown in Figure 1 at 100 and 102, communicates with the above described direct drive and reverse clutches and the reverse and low servos through a network of pressure passages which are defined in part by the transmission shift control valves. The output of the front pump is delivered to the main regulator valve through line pressure passage 200 which communicates with a manual valve through branch passage 202. The manual valve comprises a valve cavity within which is slidably received a spool valve element positively connected to a manually operable transmission range selector. If it is assumed for purposes of illustration that the manual valve is shifted to the drive range position as illustrated in Figure 2A and if it is assumed that the vehicle is stationary, control pressure will pass from branch passage 202 through the manual valve into passage 204 which extends to a hill brake valve as illustrated. The hill brake valve provides communication between passage 204 and passage 206 thereby permitting control pressure to reach the apply side of the low speed servo mechanism illustrated in Figure 2B. The transmission is thus conditioned for low speed forward drive. The low speed servo mechanism comprises a fixed cylinder and a relatively movable piston which is caused to act on a brake band engaging leverage mechanism for energizing the brake band 186.

Control pressure is also distributed to passage 208 by the manual valve, said passage 208 extending to a shift valve as illustrated in Figure 2B. When the shift valve assumes the position shown, it provides communication between the passage 208 and a passage 210 which extends to the direct drive front clutch. It is thus seen that the direct drive clutch and the low speed servo are energized while the reverse clutch and the reverse servo are de-energized and the transmission is conditioned for direct drive when the shift valve assumes this position.

A throttle valve is provided as shown in Figure 2A and it includes a valve cavity within which are positioned spool valve elements 212 and 214, the latter being acted upon by a linkage mechanism which is positively connected to the movable engine throttle. The valve elements 212 and 214 are separated by a valve spring. Line pressure communicates with the throttle valve through passage 216 and branch passages 218 and 220. The valve element 212 is adapted to control the degree of communication between branch passage 218 and throttle pressure passage 222, the latter communicating with passage 224 which extends to one side of the shift valve to provide for an upward shifting force. Throttle pressure also communicates with one end of the hill brake pilot valve as illustrated in Figure 2B through a passage 226 for supplementing the biasing action of a hill brake pilot valve spring. Throttle pressure is also transmitted by passage 224 to the right side of a compensator valve as illustrated in Figure 2A, said compensator valve comprising a multiple land spool valve element 228 which is capable of controlling the degree of communication between the branch passage 230 and the compensator pressure passage 232. The valve element 228 is biased in the right hand direction by a compensator valve spring situated in a fluid working chamber on the left side thereof. The throttle pressure is caused to act on an auxiliary valve plunger 234 and when the throttle pressure exceeds an established maximum value, the throttle pressure force acting on plunger 234 is transferred directly to valve element 228 to balance the opposing throttle pressure force acting on the other end of valve element 228.

The rear pump, as illustrated in Figure 2B, is capable of delivering fluid pressure to the governor valve through the rear pump discharge passage 236 while the engine is running and while the front pump is delivering pressure to the passage 200. Line pressure from the front pump will be delivered to the bottom end of the push start valve as illustrated, branch passage 238 being provided for this purpose. When the engine is stalled and it is desired to start the engine by means of a push start, the rear pump will deliver pressure to the fluid circuit and assume the function of the front pump until the engine begins to operate. Under such push start conditions the push start valve will assume a downward position under the influence of the rear pump discharge pressure and control pressure will be delivered from the passage 236 to the aforementioned passage 200. During normal operation the communication between passages 236 and 200 will be blocked by the push start valve and the rear pump discharge pressure will thereafter be transferred from passage 236 to the exhaust by means of a venturi passage 240. The passage 240 includes a venturi throat 242 and a static pressure passage 244 extends from the throat 242 to the upper side of the governor valve. The governor valve includes a spool valve element 246 which is capable of controlling the degree of communication between a branch passage 248 and a governor pressure passage 250. The total pressure of the rear pump is caused to act on the lower side of the spool valve element 246 and it is opposed by static pressure which exists in the venturi throat. The difference between total pressure and static pressure is equal to the velocity head of the rear pump discharge. This in turn is a positive indicator of the vehicle speed since the rear pump is positively driven by the transmission tail shaft. The difference in the valve biasing forces of the total fluid pressure and the static pressure is balanced by the force exerted by the line pressure on the lower land of the spool valve element 246. The governor pressure transferred to passage 250 supplies passage 252 which extends to the upper side of the shift valve and the hill brake pilot valve as indicated. Similarly governor pressure is supplied by passage 252 to the lower side of a stator valve as illustrated in Figure 2A to supplement the biasing action of the stator valve spring acting in an upward direction on the stator valve element 254. Governor pressure is transferred from passage 252 to the adjacent sides of a pair of valve plungers 257 and 258 located in the valve chamber for the aforementioned hill brake valve. Governor pressure is also transmitted from passage 252 to the spring chamber on the left side of the compensator valve element 228 for biasing the latter to the right as viewed in Figure 2A. Governor pressure is also transmitted to one side of an auxiliary valve plunger 260 and is capable of urging the same in a leftward direction against the opposing force exerted by line pressure in passage 216, the latter pressure acting on an annular shoulder formed on the periphery of the plunger 260. At low vehicle speeds the line pressure is capable of overcoming the effect of the governor pressure acting on valve plunger 260 thereby causing the latter to move to the right out of engagement with the compensator valve element 228. The compensator valve element 228 will regulate the magnitude of the compensator pressure in passage 232 in accordance with the force differential created by the governor pressure in the fluid chamber on the left side of the valve element 228 and the throttle pressure acting on the right end thereof. When the ratio between the governor pressure and line pressure reaches a predetermined value, the valve plunger 260 will contact the valve element 228 thereby modifying the pressure regulating characteristics thereof and to render the same insensitive to changes in vehicle speed after a limiting speed is obtained for any given throttle setting.

Compensator pressure is transferred by passage 232 to the lower end of the main regulator valve element 262 to urge the same in an upward direction against the opposing force of the main regulator valve spring 264. The valve element 262 is capable of regulating the rate at which fluid pressure is bypassed from passage 200 to a pump return passage 266, said passages 200 and 266 communicating with a common valve chamber within which the valve element 262 is situated. It is thus apparent that the magnitude of the line pressure in passage 200 will be determined by the magnitude of the compensator pressure which exists in passage 232. It thus follows that the degree with which the various transmission clutch and brake gear control elements are energized will be determined by the magnitude of the line pressure which in turn is determined by the torque requirements of the transmission.

When the vehicle continues to accelerate, a greater proportion of the engine torque will be taken by the secondary turbine member 72 until the speed of the turbine member 72 approaches the speed of the primary turbine member 42. This change in the relative capacities of the primary and secondary turbine members effects an infinitely variable torque variation as previously explained and the combined multiplication ratio of the converter and the front planetary unit 54 fades out, the entire gear multiplication of the transmission thereafter being produced in the second planetary unit 80. As the vehicle speed increases in this fashion the magnitude of the governor pressure in the control valve circuit progressively increases and at a predetermined ratio between the magnitude of the governor pressure and the throttle pressure the shift valve will assume a downward position. It will be apparent from inspection of Figure 2B that the shift valve includes a multiple land valve element 268 having a relatively large upper land on which governor pressure is caused to act and a smaller valve plunger on the lower end thereof on which throttle pressure is caused to act. When the shift valve element 268 assumes a downward position it is capable of transferring line pressure from passage 208 to a communicating passage 210 thereby pressurizing the latter and energizing the direct drive clutch. As previously explained the direct drive clutch is capble of clutching together planetary carrier 154 and sun gear 152 of the second planetary unit 80 thereby producing a driving ratio of unity. The low servo remains energized during this shift operation and the clutch element 144 is thereafter capable of overrunning the portions of the clutching assembly which are held stationary by the friction brake 186, the one-way brake mechanism 172 being capable of accommodating this overrunning motion.

When the direct drive clutch is energized in this fashion, line pressure is caused to enter one side of an accumulator valve defined in part by a movable piston element 270 as illustrated in Figure 2A. The accumulator valve is comprised of a pair of opposed accumulator chambers which are defined in part by the movable accumulator piston element 270 and the cooperating valve chamber. The piston element 270 includes two spaced portions of dissimilar diameters and when the direct drive clutch is de-energized, line pressure is free to enter the fluid chamber on the right side of the larger piston portion of the accumulator valve thereby causing the valve element 270 to shift in a leftward direction. When the shift valve assumes a downward position as above described to initiate a shift into direct drive, line pressure is caused to enter the accumulator valve chamber on the left side of the accumulator valve element 270. As the pressure in the passage 210 and the fluid chamber associated with the direct drive clutch begins to build up, the accumulator valve element 270 begins to move in a right hand direction until it reaches the limiting position as shown in Figure 2A. During this right hand movement, the fluid capacity of this portion of the fluid circuit increases thereby modifying the pressure build up therein to cushion the application of the direct drive clutch. This feature eliminates any possibility of a rough shift from intermediate driving ratio to direct drive.

It will be observed from an inspection of Figure 2B that when the shift valve assumes a downward direction, line pressure is caused to act on a differential area intermediate the adjacent valve lands of the shift valve element 268 thereby exerting a downward force. This produces a so-called hysteresis effect which will delay a down shift until the ratio between the governor pressure and the throttle pressure is somewhat lower than the corresponding ratio at which an up shift into direct drive occurs.

Under certain conditions, a so-called down shift may be obtained while the direct drive clutch remains energized and while the shift valve element 268 retains a downward position. As previously explained this may be accomplished by increasing the engine throttle setting so that the engine will operate at a higher torque. If the corresponding engine speed is accompanied by an increased torque, the percentage of this increased torque which is taken by the primary turbine member 42 will be initially greater than the percentage of the increased torque taken by the secondary turbine member 72. This will cause the ring gear 52 to overspeed the carrier 106 of the first planetary unit 54. This in turn will cause a torque reaction on the sun gear 112 and the one-way brake mechanism 120 will absorb this reaction torque and prevent reverse rotation of the sun gear 112. A down shift may also be obtained by opening the throttle valve sufficiently to increase the magnitude of the throttle pressure in passage 224 to cause the shift valve element 268 to move in an upward direction against the opposing force of the governor pressure and the line pressure acting on the differential area intermediate the adjacent valve lands.

If desired, a further down shift may be obtained by moving the throttle valve to an extreme position until the valve element 214 blocks the exhaust passage adjacent a branch passage 272, the latter communicating with passage 274. Passage 274 extends to the upper end of the stator valve element 254 as illustrated in Figure 2A. The line pressure branch passage 220 is caused to open simultaneously with the closing of the exhaust port adjacent passage 272 and line pressure is thus caused to pass through the throttle valve chamber and through the passage 272 into passage 274 thereby pressurizing the stator valve element 254. At vehicle speeds below 40 M. P. H. or below some other preselected speed, the stator valve element is shifted in a downward direction by the line pressure against the opposing force of the governor pressure acting on the lower end of the valve element 254. When the valve element 254 assumes a downward position, line pressure is transferred from passage 276 to passage 278, both of which communicate with the stator valve chamber. Line pressure is thus transferred to one side of the annular piston member 86 within the converter reactor assembly thereby causing the same to shift and to rotate the associated adjustable stator blades 82 to condition the converter for operation in a higher torque ratio range. Passage 278 further conducts fluid pressure to one side of the compensator valve element 228 to urge the same in a left hand direction. This causes a decrease in the magnitude of the compensator valve pressure in the passage 232 since the force differential acting on the valve element 228 is temporarily upset. The modified compensator pressure in turn acts on the main regulator valve to cause an increase in the effective line pressure in the fluid circuit thereby increasing the capacity of the transmission clutch and brake gear control elements to accommodate the higher torque resulting from the increased torque ratio of the hydrokinetic converter. A ball check valve element 280 may be positioned in the passage 278 to prevent the fluid pressure in passage 278 from exhausting through a communicating passage 282 and through the manual valve.

To condition the transmission for reverse drive operation the manual valve may be moved to the position indicated by the letter "R" thereby exhausting passage 208 and passages 284 and 286, the latter two passages communicating with the manual valve at a location adjacent passage 208. Immediately prior to movement of the manual valve to reverse drive position, the hill brake pilot valve assumes an upward position and line pressure is transferred through the hill brake pilot valve from passage 286 to passage 288, the latter extending to the upper side of the hill brake valve chamber within which is slidably positioned a hill brake valve element 290. However, when the manual valve assumes the reverse drive position, passage 286 and communicating passage 288 are exhausted thereby relieving the line pressure on the upper side of the spool valve element 290 thus causing the latter to move in an upward direction under the influence of hill brake valve spring 292. When the valve element 290 assumes an upward position, passage 206 is exhausted and control pressure is caused to transfer from passage 204 through the hill brake valve chamber to passage 294 which extends to the reverse brake servo.

A passage 296 extends to the reverse drive clutch and it communicates with the manual valve thereby causing the same to become pressurized with line pressure when the manual valve element assumes the reverse drive position.

The shift valve element 268 assumes an upward position immediately prior to movement of the manual valve to the reverse drive position since the governor pressure is reduced to zero. This causes the passage 208 to become blocked while the passage 210 becomes exhausted thereby de-energizing the direct drive clutch. Since the reverse clutch and the reverse servo are both energized while the direct drive clutch and the low speed servo are de-energized, the transmission will operate in reverse drive range as previously explained. It will be observed that passage 282 will communicate with line pressure in the region of the manual valve when the manual valve element assumes a reverse drive position thereby causing line pressure to act on the right side of the compensator valve element 228, the check valve 280 assuming a leftward direction to prevent line pressure from becoming exhausted through passage 278. This causes a decrease in the compensator pressure as previously explained which in turn modifies the regulating characteristics of the main regulating valve to produce a higher pressure level for the control pressure thereby accommodating the higher torque requirements of gear control elements during reverse operation.

The control circuit heretofore described is further capable of conditioning the transmission mechanism of Figure 1 for engine braking. For purposes of illustration, it will be assumed that the vehicle is traveling under steady state road conditions at a relatively high speed. Under these conditions the hill brake pilot valve will be in a downward position thereby causing passages 286 and 288 to become exhausted. However, if the operating conditions are such that the hill brake pilot valve is in an upward position before hill braking is effected, it will immediately assume a downward direction as soon as the operator retracts the engine throttle setting since this would be accompanied by a decrease in throttle pressure and the governor pressure would thus overcome the hill brake pilot valve spring acting in the upward direction. The vehicle operator may simultaneously shift the manual valve element to the hill brake position indicated in Figure 2A by the letters "HB." The passage 208 will become exhausted when the manual valve assumes the hill brake position thereby causing the passage 210 and the direct drive clutch to become exhausted, said passages 208 and 210 communicating through the shift valve under these conditions. The hill brake valve element 290 will retain its downward position following the exhaust of the passage 288, the governor pressure in the passage 256 being effective to maintain the valve element 290 in a downward position against the opposing force of the spring 292 at any speed in excess of 20 M. P. H. or any other preselected road speed. It is thus apparent that the low speed servo will continue to be energized at any speed in excess of 20 M. P. H. when the manual valve assumes the hill brake position since the passage 204 continues to communicate with the passage 206 through the hill brake valve. The engine braking effect which may be obtained with the transmission in the intermediate drive ratio is substantially greater than that which would be obtained without such a provision for an automatic down shift. As noted from Figure 2A, the rear clutch assembly 142, 124 and 138 is energized when the manual valve is moved to the hill brake position thus accommodating a torque reversal through the rear planetary unit, the sun gear serving as the reaction member. When the vehicle speed falls below 20 M. P. H., the governor pressure in passage 256 is no longer sufficient to overcome the force of the spring 292 and the hill brake valve element 290 assumes an upward position thereby causing the passage 206 and the low speed servo to become exhausted. Simultaneously, the passage 204 is brought into communication with the passage 294 through the hill brake valve chamber thus energizing the reverse drive servo. The passage 296 communicates with passage 202 through the manual valve element when the latter assumes a hill brake position thus causing the reverse drive clutch to become energized. Since the reverse clutch and the reverse drive servo are both energized in this fashion, a higher degree of engine braking will be effected since the transmission will operate in reverse. If the vehicle operator should desire to accelerate the vehicle when the transmission is operating in the reverse hill brake condition, the accompanying increase in engine throttle setting will cause an increase in the magnitude of the throttle pressure thus causing the hill brake pilot valve to move in an upward direction against the opposing force of the governor pressure. This will cause the passages 286 and 288 to again communicate through the hill brake pilot valve thus pressurizing the upper end of the hill brake valve and urging the latter in a downward direction to cause the transmission to shift from reverse into a low speed operation. This latter feature eliminates any possibility of damaging the transmission due to forward operation of the vehicle under power while the transmission is in reverse drive range.

If the hill brake operation continues until the vehicle reaches a speed of eight M. P. H., the governor pressure will no longer be sufficient to hold the hill brake pilot valve in a downward position against the opposing force of the hill brake pilot valve spring. The hill brake pilot valve will therefore assume the position shown in Figure 2B to provide communication between passage 286 and 288 to again bias the hill brake valve 290 in a downward direction to condition the transmission for low speed operation. It is thus apparent that hill brake operation occurs in three stages to provide a maximum degree of braking and a high degree of smoothness.

Although I have particularly described the principal features of a preferred embodiment of my invention, I contemplate that many variations may be made thereto without departing from the spirit and scope of the invention as defined by the appended claims.

What I claim and desire to secure by United States Letters Patent is:

1. An automatic power transmission mechanism comprising a hydrokinetic torque converter and a pair of torque multiplying gear units, said torque converter including a primary and a secondary turbine, each of said gear units including a sun gear, a ring gear and a planet gear carrier assembly, planet gears rotatably mounted on the carrier assembly of each gear unit in meshing engagement with the respective sun and ring gears thereof the primary turbine being connected to the ring gear of a first of said gear units, the secondary turbine being connected to the carrier assembly of said first gear unit and to the ring gear of the other of said gear units, and means for braking the sun gear of each of said planetary units, the carrier assembly of said other planetary unit being connected to driven portions of the transmission mechanism.

2. An automatic power transmission mechanism comprising a hydrokinetic torque converter and a pair of torque multiplying planetary gear units, said torque converter including a primary and secondary turbine, each of said gear units including a sun gear member, a ring gear member and a planet gear carrier member, planet gears rotatably mounted on the carrier member of each gear unit in meshing engagement with the respective sun and ring gear members thereof, the primary turbine being connected to the ring gear member of a first of said gear units, the secondary turbine being connected to the carrier member of said first gear member unit and to the ring gear of the other gear unit, the carrier member of said other gear unit being connected to a power output member of said transmission mechanism, clutch means for selectively clutching together relatively movable members of said other planetary unit and brake means for preventing rotation of the sun gear member of each of said gear units in one direction to accommodate the torque reaction during operation.

3. In an automatic power transmission mechanism capable of delivering power from a vehicle engine to a driven member, a hydrokinetic torque converter comprising an engine driven pump member, a primary turbine member and a secondary turbine member, a first and a second planetary gear unit, said planetary gear units each comprising a sun gear, a ring gear and a planet carrier, planet gears rotatably mounted on the carrier of each gear unit in meshing engagement with the respective sun and ring gears thereof, the primary turbine member being connected to the ring gear of said first planetary unit, the secondary turbine being connected to the carrier of the first planetary unit and to the ring gear of the second planetary gear unit, means for selectively clutching together the carrier and the sun gear of the second planetary gear unit to effect a direct drive ratio through said second gear unit and brake means for braking the sun gear of each planetary gear unit to accommodate the driving torque reaction, the carrier of said second planetary gear unit being connected to said driven member.

4. In an automatic power transmission mechanism capable of delivering power from a vehicle engine to a driven member, a hydrokinetic torque converter unit comprising a pair of turbine members and an engine driven pump member, a pair of planetary gear units, each of said gear units including a ring gear member, a sun gear member and a planet gear carrier member, planet gears rotatably mounted on the carrier member of each gear unit in meshing engagement with the respective sun and ring gear members thereof, a first of said turbine members being connected to the ring gear of a first of said gear units, the other of said turbine members being connected to the carrier member of said first gear unit and to the ring gear member of said other gear unit, the carrier member of said other gear unit being connected to the driven member, clutch means for interconnecting two relatively movable members of said other gear unit to effect a direct drive through the same, a brake member, means for selectively braking and releasing said brake member, first one-way clutch means for transferring the torque reaction of said first gear unit to said brake member and a second one-way clutch means for transferring the torque reaction of the sun gear member of said other gear unit to said brake member.

5. In an automatic power transmission mechanism capable of delivering power from a vehicle engine to a driven member, a hydrokinetic torque converter unit comprising a pair of turbine members and a pump member, a pair of gear units, each of said gear units including a ring gear element, a sun gear element and a planet gear carrier element, planet gears rotatably mounted on the carrier element of each gear unit in meshing engagement with the respective sun and ring gear elements thereof, a first of said turbine members being connected to the ring gear element of a first of said gear units, the other of said turbine members being connected to the carrier element of said first gear unit and to the ring gear element of said other gear unit, the carrier element of said other gear unit being connected to said driven member, clutch means for interconnecting two relatively movable elements of said other gear unit to effect a direct drive through the same, a brake member rotatably mounted in concentric relationship with respect to said gear units, means for selectively braking and releasing said brake member, first one-way coupling means for transferring the torque reaction of said first gear unit to said brake member, a friction clutch means for drivably connecting said brake member and the sun gear element of said second planetary unit to accommodate the delivery of power from said first gear unit to the sun gear of said second gear unit to effect reverse drive operation, said first one-way clutch means forming a portion of the power delivery path through said gear units during reverse drive operation, and second one-way coupling means for transferring the torque reaction of the sun gear of said other gear unit to said brake member during low and intermediate speed operation.

6. In an automatic power transmission mechanism capable of delivering power from a vehicle engine to a driven member, a hydrokinetic torque converter unit comprising a pair of turbine members and a pump member, a pair of gear units, each of said gear units including a ring gear member, a sun gear member and a planet gear carrier member, planet gears rotatably mounted on the carrier member of each gear unit in meshing engagement with the respective sun and ring gear members thereof, a first of said turbine members being connected to the ring gear member of a first of said gear units, the other of said turbine members being connected to the carrier member of said first gear unit and to the ring gear member of said other gear unit, the carrier member of said other gear unit being connected to said driven member, clutch means for interconnecting two relatively movable members of said other gear unit to effect a direct drive through the same, a brake member rotatably mounted in concentric relationship with respect to said gear units, first friction brake means for selectively braking and releasing said brake member, first one-way coupling means for transferring the torque reaction of said first gear unit to said brake member, a friction clutch means for drivably connecting said brake member and the sun gear member of said second planetary unit to accommodate the delivery of power from said first gear unit to the sun gear member of said second gear unit to effect reverse drive operation, said first one-way coupling means forming a portion of the power delivery path through said gear units during reverse drive operation, second friction brake means for selectively braking the carrier member of said first gear unit, said second friction brake means and said friction clutch means being adapted to be simultaneously energized to effect reverse drive operation, and second one-way coupling means for transferring the torque reaction of the sun gear member of said other gear unit to said brake member during low and intermediate speed operation.

7. In an automatic power transmission mechanism capable of delivering power from a vehicle engine to a driven member, a hydrokinetic torque converter unit comprising a pair of turbine members and a pump member, the latter being drivably connected to said engine, said converter unit further including a bladed reactor member situated between one turbine member and said pump member, a pair of planetary gear units, each of said gear units including a ring gear element, a sun gear element and a planet gear carrier element, planet gears rotatably mounted on the carrier element of each gear unit in meshing engagement with the respective sun and ring gear elements thereof, a first of said turbine members being connected to the ring gear element of a first of said gear units, the other of said turbine members being connected to the carrier element of said first gear unit and to the ring gear element of said other gear unit, the carrier element of said other gear unit being connected to said driven member, clutch means for interconnecting two relatively movable elements of said other gear unit to effect a direct drive through the same, a brake member, means for selectively braking and releasing said brake member, first one-way coupling means for transferring the torque reaction of said first gear unit to said brake member, second one-way coupling means for transferring the torque reaction of the sun gear element for said other gear unit to said brake member, said reactor member comprising a cascade of blade elements, and means for adjustably positioning the individual reactor blade elements to vary the effective operating angle of the same thereby altering the operating characteristics of the converter unit.

8. In an automatic power transmission mechanism capable of delivering power from a vehicle engine to a driven member, a hydrokinetic torque converter unit comprising primary and secondary turbine members and a pump member, said converter members defining in part a fluid torus circuit, said hydrokinetic torque converter unit further including a bladed reactor member interposed between the exit of said secondary turbine member and the entrance of said pump member, a plurality of radially extending shafts, each of the individual blades of said reactor member being mounted on one of said radially extending shafts, an annular piston slidably disposed in said reactor member, a connection between said annular piston and the radially inward ends of said shafts, said piston being adapted to adjust said shafts and said blades about substantially radial axes to alter the operating characteristics of said converter unit, a first planetary gear unit including a ring gear element, a carrier element and a sun gear element, planet gears rotatably mounted on said carrier element in meshing engagement with said sun and ring gear elements, one of said turbine members being connected to said ring gear element; a second gear unit including a ring gear element, a sun gear element, a carrier element and planet gears mounted on said carrier element in meshing engagement with the associated ring and sun gear elements; said gear units defining in part a pair of torque delivery paths between said engine and said driven member, a first element of said second gear unit being connected to said driven member, a mechanical connection between the other of said turbine members and a second element of said second gear unit, the carrier element of said first gear unit being connected to an element of said second gear unit, a releasable forward drive brake mechanism, first overrunning coupling means for connecting the sun gear element of said first gear unit to said brake mechanism, second overrunning coupling means for connecting a third element of said second gear unit to said brake mechanism, and a releasable reverse drive brake means for anchoring an element of said first gear unit, one of said coupling means defining in part a torque transfer path between the third element of said second gear unit and the sun gear element of said first gear unit during reverse drive operation when said forward drive brake mechanism is released and said reverse drive brake means is applied.

9. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof one element of said second gear unit being connected to said driven member, and a double power delivery path between said hydrokinetic unit and said second gear unit, one path being comprised of a mechanical connection between one of said turbine members and another element of said second gear unit and the other path being defined in part by said first gear unit, one element of the latter being connected to the other turbine member, another element of said first gear unit being coupled to said other element of said second gear unit, means for braking a third element of said first and second gear units to absorb the driving torque reaction, said braking means comprising a brake drum, a brake band encircling said drum and adapted to frictionally engage and anchor the same, a brake member positively connected to said drum, a one-way brake disposed adjacent said brake member and a torque transfer means for transmitting the driving torque reaction of said first gear unit from the third element thereof to said one-way brake, and means for clutching together said brake member and the third element of said second gear unit to accommodate the delivery of a reverse driving torque to said driven member, and independent brake means for anchoring said other element of said first gear unit to effect reverse drive operation.

10. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof one element of said second gear unit being connected to said driven member, and a double power delivery path between said hydrokinetic unit and said second gear unit, one of said paths being comprised of a mechanical connection between one of said turbine members and another element of said second gear unit, and the other path being defined in part by said first gear unit, one element of the latter being connected to the other turbine member, another element of said first gear unit being coupled to said other element of said second gear unit, means for clutching together two elements of said second gear unit to effect a driving ratio therein of unity and means for braking the third element of said first and said second gear units to absorb the driving torque reaction.

11. The combination as set forth in claim 10 wherein said braking means comprises a one-way brake mechanism for anchoring the third element of said second gear unit against rotation in one direction while accommodating an overrunning motion thereof with respect to relatively stationary portions of the braking means when the aforesaid clutching means is energized.

12. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof one element of said second gear unit being connected to said driven member, and a pair of power delivery paths between said hydrokinetic unit and said driven member, one path being comprised of a mechanical connection between one of said turbine members and another element of said second gear unit and the other path being defined in part by said first gear unit, one element of the latter being connected to the other turbine member, another element of said first gear unit being coupled to said other element of said second gear unit, means for braking a third element of said first and second gear units to absorb the driving torque reaction, said braking means comprising a one-way brake disposed adjacent a relatively stationary portion of said mechanism, and a torque transfer means for transmitting the driving torque reaction of said first gear unit from the third element thereof to said one-way brake, said braking means further including a second one-way brake situated adjacent said relatively stationary portion and adapted to absorb the driving torque reaction exerted on the third element of said second gear unit.

13. In an automatic power transmission mechanism comprising a hydrokinetic torque converter and a pair of torque multiplying gear units, said torque converter including a pump, a primary turbine, a secondary turbine and a reactor, overrunning brake means for inhibiting rotation of said reactor in one direction, said pump, turbines and reactor being adapted to act in toroidal fluid flow relationship each of said gear units including a sun gear member, a ring gear member and a planet gear carrier member, planet gears rotatably mounted on the carrier member of each gear unit in meshing engagement with the respective sun and ring gear members thereof, means for connecting the primary turbine to the ring gear member of a first unit of said pair of gear units, means for connecting the secondary turbine to the carrier member of said first gear unit and to a first member of a second unit of said pair of gear units, a mechanical brake mechanism, a first overrunning coupling means defining in part a connection between the sun gear member of said first gear unit and said mechanical brake mechanism whereby said sun gear member of said first gear unit is inhibited against rotation in one direction, a second overrunning coupling means defining in part a connection between a second member of said second gear unit and said brake mechanism whereby said second member of said second gear unit is inhibited against rotation in one direction, one member of said second unit being connected to driven portions of the transmission mechanism.

14. In an automatic power transmission mechanism comprising a hydrokinetic torque converter and a pair of torque multiplying gear units, said torque converter including a pump, a primary turbine, a secondary turbine and a reactor, overrunning brake means for inhibiting rotation of said reactor in one direction, said pump, turbines and reactor being adapted to act in toroidal fluid flow relationship, each of said gear units including a sun gear member, a ring gear member and a planet gear carrier member, planet gears rotatably mounted on the carrier member of each gear unit in meshing engagement with the respective sun and ring gear members thereof, means for connecting the primary turbine to the ring gear member of a first unit of said pair of gear units, means for connecting the secondary turbine to the carrier member of said first gear unit and to a first member of a second unit of said pair of gear units, a mechanical brake mechanism, a first overrunning coupling means defining in part a connection between the sun gear member of said first gear unit and said mechanical brake mechanism whereby said sun gear member of said first gear unit is inhibited against rotation in one direction, a second overrunning coupling means defining in part a connection between a second member of said second gear unit and said brake mechanism whereby said second member of said second gear unit is inhibited against rotation in one direction, one member of said second unit being connected to driven portions of the transmission mechanism, the connection between the sun gear member of said first gear unit and said brake mechanism and the connection between said second member of said second gear unit and said brake mechanism each having a common portion, one of said coupling means and said common connection portion defining in part a mechanical torque transfer path between said second member of said second gear unit and the sun gear member of said first gear unit when said mechanical brake mechanism is de-energized, and auxiliary brake means for selectively anchoring one member of said first gear unit whereby a reverse torque is imparted to said power output member when said mechanical brake mechanism is de-energized.

15. An automatic power transmission mechanism comprising a hydrokinetic torque converter and a pair of torque multiplying planetary gear units, said torque converter including a pump, a primary turbine, a secondary turbine and a reactor, overrunning brake means for inhibiting rotation of said reactor in one direction, said pump, turbines and reactor being adapted to act in toroidal fluid flow relationship, each of said gear units including a sun gear member, a ring gear member and a planet gear carrier member, planet gears rotatably mounted on the carrier member of each gear unit in meshing engagement with the respective sun and ring gear members thereof, means for connecting the primary turbine to the ring gear member of a first unit of said pair of gear units, means for connecting the secondary turbine to the carrier member of said first gear unit and to a first member of a second unit of said pair of gear units, means for braking a second member of said second gear unit, one member of said second gear unit being connected to a driven portion of the transmission mechanism, said last named braking means including a selectively operable friction brake mechanism and a first overrunning coupling means for connecting said second member of said second gear unit to said brake mechanism thereby inhibiting rotation of said second member of said second gear unit in one direction, a second overrunning coupling means for connecting the sun gear member of said first gear unit to said brake mechanism thereby inhibiting rotation of said sun gear member of said first gear unit in one direction, and additional brake means for anchoring one member of said first gear unit to effect reverse operation, one of said overrunning coupling means defining in part a mechanical torque transfer path between said sun gear member of said first gear unit and said second member of said second gear unit when said selectively operable brake mechanism is de-energized and said transmission mechanism is conditioned for reverse operation.

16. In an automatic power transmission mechanism capable of delivering power from a vehicle engine to a driven member, a hydrokinetic torque converter unit comprising primary and secondary turbine members and a pump member, said converter members defining in part a fluid torus circuit, said hydrokinetic torque converter unit further including a bladed reactor member interposed between the exit of said secondary turbine member and the entrance of said pump member, a plurality of radially extending shafts, each of the individual blades of said reactor member being mounted on one of said radially extending shafts, an annular piston slidably disposed in said reactor member, a connection between said piston and the radially inward ends of the shafts, said piston being adapted to adjust said shafts and said blades about substantially radial axes to alter the operating characteristics of said converter unit, a planetary gear mechanism forming a pair of power delivery paths extending from said engine to said driven member and including a first gear unit comprising a ring gear element, a carrier element and a sun gear element, planet gears rotatably mounted on said carrier element in meshing engagement with said sun and ring gear elements, means for connecting one of said turbine members to said ring gear element; a second gear unit comprising a sun gear element, a ring gear element, a carrier element and planet gears mounted on said carrier element in meshing engagement with the associated sun and ring gear elements; a brake member, first overrunning coupling means for connecting the sun gear element of said first gear unit to said brake member, second overrunning coupling means for connecting a first element of said second gear unit to said brake member, means for connecting the other turbine member to a second element of said second gear unit, and means for transmitting power from each carrier element to said driven member.

17. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof one element of said second gear unit being connected to said driven member, and a pair of power delivery paths between said hydrokinetic unit and said driven member, one path being comprised of a direct, continuously effective mechanical connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit, means for braking a third element of said first and second gear units to absorb the driving torque reaction, said braking means comprising a one-way brake disposed adjacent a relatively stationary portion of said mechanism and a torque transfer means for transmitting the driving torque reaction of said first gear unit from the third element thereof to said one-way brake, said braking means further including a second one-way brake situated adjacent said relatively stationary portion and adapted to absorb the driving torque rection exerted on the third element of said second gear unit.

18. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof, one element of said second gear unit being connected to said driven member, and a pair of power delivery paths between said hydrokinetic unit and said driven member, one path being comprised of a direct, continuously effective connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit and means for braking a third element of said first and second gear units to absorb the driving torque reaction, said braking means comprising a one-way brake disposed adjacent a relatively stationary portion of said mechanism and a torque transfer means for transmitting the driving torque reaction of said first gear unit from the third element thereof to said one-way brake.

19. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof, one element of said second gear unit being connected to said driven member, and a pair of power delivery paths between said hydrokinetic unit and said driven member, one path being comprised of a direct, continuously effective mechanical connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit, and means for braking a third element of said first and second gear units against a relatively stationary portion of said mechanism to absorb the driving torque reaction, said braking means comprising a one-way brake disposed adjacent said relatively stationary portion of said mechanism and a torque transfer means for transmitting the driving torque reaction of said first gear unit from the third element thereof to said one-way brake, said relatively stationary portion comprising a brake member and a friction brake element encircling said brake member, said friction brake element being adapted to frictionally anchor said brake member to maintain the same in a relatively stationary position during operation of the transmission mechanism.

20. In a power transmission mechanism for transferring power from an engine to a driven member, a hydrokinetic unit comprising a fluid pump, a pair of turbine members cooperating with said pump to define a fluid torus circuit, a first and a second planetary gear unit, each gear unit including a sun gear element, a ring gear element and a planet gear carrier element, planet gears rotatably mounted on the carrier element of each gear unit in meshing engagement with the respective sun and ring gear elements thereof, one element of said second gear unit being connected to said driven member, and a pair of power delivery paths between said hydrokinetic unit and said driven member, one path being comprised of a direct, continuously effective mechanical connection between one of said turbine members and another element of said second gear unit and the other path being defined in part by said first gear unit, a direct, continuously effective mechanical connection between one element of the latter and the other turbine member, another element of said first gear unit being coupled to an element of said second gear unit and means for braking a third element of said first and second gear units against a relatively stationary portion of said mechanism to absorb the driving torque reaction, said braking means comprising first and second one-way brakes respectively defining in part torque transfer means for transmitting the driving torque reaction of said first and second gear units from the respective third elements thereof to said stationary portion.

References Cited in the file of this patent

UNITED STATES PATENTS

| | | | |
|---|---|---|---|
| 2,292,384 | Lysholm | Aug. 11, | 1942 |
| 2,292,385 | Lysholm | Aug. 11, | 1942 |
| 2,550,082 | Orr | Apr. 24, | 1951 |
| 2,623,411 | Herndon | Dec. 30, | 1952 |
| 2,737,827 | Seybold | Mar. 13, | 1956 |
| 2,737,494 | Russell | Mar. 27, | 1956 |
| 2,803,974 | Kelley | Aug. 27, | 1957 |
| 2,813,437 | Kelbel et al. | Nov. 19, | 1957 |

UNITED STATES PATENT OFFICE
CERTIFICATE OF CORRECTION

Patent No. 2,855,803                                                                 October 14, 1958

James Knowles

It is hereby certified that error appears in the printed specification of the above numbered patent requiring correction and that the said Letters Patent should read as corrected below.

Column 2, line 35, strike out "ineffective and"; line 36, after "becomes" insert -- ineffective and --; column 3, line 2, for "itnermediate" read -- intermediate --; column 4, line 9, after "of", insert -- a --; line 28, for "pivotally" read -- positively --; column 5, line 4, for "is" read -- are --; column 6, line 26, for "numbers" read -- members --; column 11, line 69, for "capble" read -- capable --; column 15, line 7, for "passage" read -- passages --; line 27, after "thereof" insert a comma; line 46, strike out "member"; second occurrence; line 47, after "gear", first occurrence, insert -- member --; column 18, lines 32 and 66, and column 19, line 22, after "thereof", in each occurrence, insert a comma; same column 19, line 51, after "relationship" insert a comma; column 19, line 65, after "direction," insert -- and --; column 21, line 48, after "thereof" insert a comma; line 69, for "rection" read -- reaction --.

Signed and sealed this 10th day of March 1959.

(SEAL)
Attest:
KARL H. AXLINE                                                                        ROBERT C. WATSON
Attesting Officer                                                                     Commissioner of Patent

Notice of Adverse Decision in Interference

In Interference No. 91,622 involving Patent No. 2,855,803, J. Knowles, TWIN TURBINE TRANSMISSION, final judgment adverse to the patentee was rendered Nov. 6, 1964, as to claims 8, 13, 14, 15, 16, 17, 18, 19 and 20.
[*Official Gazette March 30, 1965.*]

Disclaimer 2,855,803.—*James Knowles*, Bloomfield Hills, Mich. TWIN TURBINE TRANSMISSION. Patent dated Oct. 14, 1958. Disclaimed filed Jan. 25, 1965, by the inventor; the assignee, *Ford Motor Company*, consenting.

Hereby enters this disclaimer to claims 8 and 13 through 20 of said patent.
[*Official Gazette May 11, 1965.*]